No. 724,228. PATENTED MAR. 31, 1903.
J. J. WOOD.
ELECTRIC CIRCUIT BREAKER.
APPLICATION FILED MAY 8, 1901.
NO MODEL. 6 SHEETS—SHEET 1.

WITNESSES:
Fred White
Rene Bruine

INVENTOR:
James J. Wood,
By Attorneys,

No. 724,228. PATENTED MAR. 31, 1903.
J. J. WOOD.
ELECTRIC CIRCUIT BREAKER.
APPLICATION FILED MAY 8, 1901.
NO MODEL. 6 SHEETS—SHEET 2.

WITNESSES:
Fred White
René Bruine

INVENTOR:
James J. Wood,
By Attorneys,

No. 724,228. PATENTED MAR. 31, 1903.
J. J. WOOD.
ELECTRIC CIRCUIT BREAKER.
APPLICATION FILED MAY 8, 1901.
NO MODEL. 6 SHEETS—SHEET 4.

WITNESSES:
Fred White
René Bruine

INVENTOR:
James J. Wood,
By Attorneys,

No. 724,228. PATENTED MAR. 31, 1903.
J. J. WOOD.
ELECTRIC CIRCUIT BREAKER.
APPLICATION FILED MAY 8, 1901.
NO MODEL. 6 SHEETS—SHEET 5.

WITNESSES:
Fred White
René Bruine

INVENTOR:
James J. Wood,
By Attorneys,
Arthur C. Draper & Co.

UNITED STATES PATENT OFFICE.

JAMES J. WOOD, OF FORT WAYNE, INDIANA.

ELECTRIC-CIRCUIT BREAKER.

SPECIFICATION forming part of Letters Patent No. 724,228, dated March 31, 1903.

Application filed May 8, 1901. Serial No. 59,232. (No model.)

*To all whom it may concern:*

Be it known that I, JAMES J. WOOD, a citizen of the United States, residing at Fort Wayne, in the county of Allen and State of Indiana, have invented certain new and useful Improvements in Electric-Circuit Breakers, of which the following is a specification.

This invention relates to circuit-breakers adapted for breaking circuits carrying currents of high energy. In breaking such circuits under load an extremely quick separation of the contact-terminals is necessary, and much difficulty is encountered by reason of the arc which is drawn between the terminals during their separation. For circuits carrying a current of high energy, such as is commonly used for electric railways, it is often found necessary to provide some means for blowing out this arc.

My present invention is based upon the principle of using the large volume of gases or vapors which are produced upon the formation of such an arc for blowing out the arc. To this end I provide for inclosing the circuit-terminals in a suitable passage, within which at least one of them may move in the act of separation, and the passage being of such shape and dimensions as to confine the vapors which constitute the arc and project these in such direction and with such force as to rupture or blow out the arc. I form the passage, preferably, by means of a tube of insulating material, which tube is provided with an outlet-orifice suitably located, preferably at such point that when the terminals are separated it shall be between them, and in order to properly direct the outflowing stream or blast of vapors from this outlet a suitable tube or branch is extended in such direction as may project the vapors with safety. I preferably mount one of the terminals fixedly, but adjustably, in the insulating-tube and construct the other in the form of a plunger, so arranging it that it may move longitudinally within the tube, and I provide operative means for imparting to it an extremely quick movement.

In the preferred construction of my circuit-breaker I provide both main and shunt terminals with a movable bridge adapted to normally carry the current between the main terminals, and I so construct the operating means that it is adapted to first move the bridge to break the main circuit and throw the current through the shunt, the conductivity of which is ample for preventing any serious sparking or arcing during the separation of the bridge from the main terminals, and immediately after such separation the shunt-terminals are separated by a quick movement to effect the final break of the circuit. It is when making this final break that the arc is formed, and hence it is the shunt-terminals which I inclose in the passage adapted to cause the arc to blow itself out. For currents of comparatively low energy a single break, and consequently a single pair of shunt-terminals, is sufficient. For currents of higher energy, where a single break would be inadequate, I provide a double break by arranging two pairs of shunt-terminals serially in the same shunt and connecting the movable terminals or plungers, so that they move simultaneously, and thereby break the shunt at two points. For currents of still higher energy I may arrange three or more pairs of shunt-terminals, so as to break the shunt simultaneously at three or more points.

For the protection of the dynamo or other generator in case of an overload, such as the formation of an accidental short circuit, I render the circuit-breaker automatic in its operation, so that upon the current exceeding a certain predetermined volume the circuit-breaker will automatically operate to break the circuit. To this end I provide it with an electromagnet, which is adapted to respond to an excessive current to attract its armature or other movable member, and thereby release a catch or detent and set in operation the mechanism by which the circuit-breaker is actuated.

In addition to the general features thus indicated my invention provides several novel features of construction and of detail, all of which will be fully set forth hereinafter.

In the drawings I have shown my invention in detail in two forms—first, as applied to a single-break circuit-breaker, and, second, in my preferred form, as applied to a double-break circuit-breaker. I have also indicated its applicability to circuit-breakers having three or four breaks.

Figure 1 is a front elevation of a single-break circuit-breaker, of which Fig. 2 is a side elevation, Fig. 3 an inverted plan, and Fig. 4 a sectional front elevation cut in part on the line 4 4 in Fig. 2, and thus differing from Fig. 1 in omitting certain parts on the front of the instrument, and also showing it in the position assumed after operation. Figs. 5 and 6 are fragmentary sectional elevations of the shunt-terminals and their accessories, Fig. 5 being a front elevation, partly in section, and showing the parts before operation, while Fig. 6 is a side elevation, mainly in vertical mid-section, and showing the parts after operation. Fig. 7 is a fragmentary sectional elevation of the plunger K, and Fig. 8 is a cross-section thereof on the line 8 8 in Fig. 7. Fig. 9 is a fragmentary sectional plan of the operating-lever J. Fig. 10 is a front elevation, and Fig. 11 a side elevation, of the catch Q. Fig. 12 is a sectional front view of the overload-magnet, omitting its coil. The double-break circuit-breaker is shown in Figs. 13 to 18, inclusive, wherein Figs. 20 to 27, inclusive, are diagrams showing several different forms of my invention, of which Figs. 20 and 21 show a single-break circuit-breaker, Figs. 22 and 23 show a double-break form, Figs. 24 and 25 show a triple-break form, and Figs. 26 and 27 show a quadruple-break form. The left-hand or even-numbered figures show the circuit closed, and the right-hand or odd numbers show the circuit broken.

Referring generally to the several figures of the drawings, let A A' designate main-circuit terminals united in any suitable manner to the conductors of the circuit and in normal condition electrically connected together by means of a conducting-bridge B, which thus constitutes a part of the main circuit.

Let C designate as a whole a shunt-circuit between the terminals A A', in which shunt-circuit is introduced one or more pairs of shunt-circuit terminals or final circuit-breaking terminals D and E. In a single-break circuit-breaker there is one pair of these terminals D E, in a double-break circuit-breaker there are two pairs, in a triple-break circuit-breaker there are three pairs, and so on. The terminals D E may be both movable, or one may be fixed and the other movable in order by its movement to effect their separation, and thereby the final breaking of the circuit. Where one is fixed and the other movable, I will refer to the fixed terminal as D and the movable one as E. In the main circuit is introduced the coil F of an overload-magnet, which magnet as a whole I will refer to as M. This magnet-coil F, I have shown as connected between the main terminal A and a suitable binding-post G, so that the main-circuit conductor may be joined at one end to this binding-post G and at the other to a binding-post G', which forms an extension of or is otherwise connected to the main terminal A'. The several electrical connections are clearly indicated in the diagrams, Figs. 20 to 27.

The shunt-terminals D E are inclosed within a chamber or passage P in order that when separated the vapors forming the arc drawn between them shall be measurably confined in this passage and in escaping therefrom through an outlet passage or orifice P' shall form so powerful an outblast that the velocity of the current of vapors or gases thus created shall blow out the arc. The walls inclosing this passage P must be non-conducting, and I preferably form the passage by means of a tube N, of any suitable insulating material—such, for example, as vulcanized fiber or a firm dense wood which has been treated to render it fireproof and preferably waterproof.

I provide a weight or spring or other operative means tending to separate the shunt-terminals and to separate the bridge B from one or preferably both main terminals, the moving parts being so connected as to insure the main circuit being broken by the movement of the bridge B before the separation of the shunt-terminals begins. The former movement may be a slow one, but the latter must be a quick movement. I provide, preferably, an actuating part or operating member, which may, for example, be a lever, which is arranged when released to fall by gravity with accelerating speed, and the initial slow movement of which shall be utilized in breaking the main circuit by the described movement of the bridge B, while a hammer-blow delivered by said member after the acceleration of its movement moves a terminal of the shunt-circuit to break the same suddenly and separate the shunt-terminals widely. I also provide a spring or springs by which during this movement the shunt-terminals are held pressed together until a point has been reached where the bridge B is sufficiently separated from the main terminals and the actuating part has attained a suitable acceleration of speed, whereupon it becomes effective to separate the shunt-terminals, whereby these are separated with the requisite velocity. This spring thus serves to assist the initial movement of the operating member and to take up the lost motion between it and the shunt-terminal. The actuating part is normally restrained from movement by a catch or detent, which may be released manually in case it is desired to break the circuit, or in case of an overload is released automatically by the action of the overload or main-circuit magnet.

Figure 1:
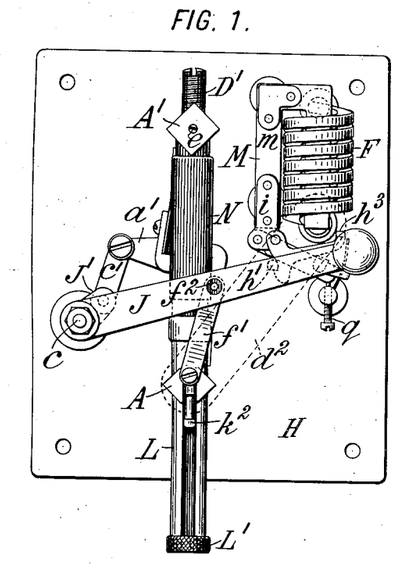
Figure 2:
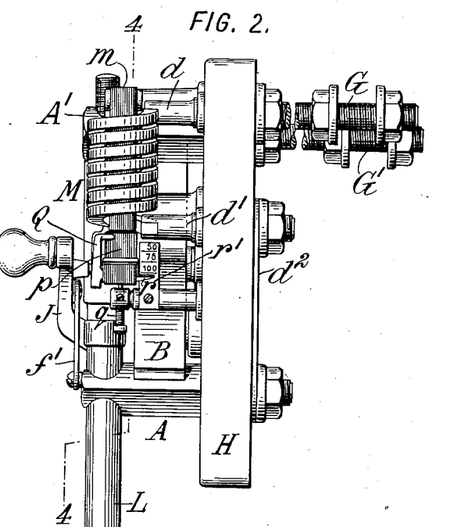
Figure 3:
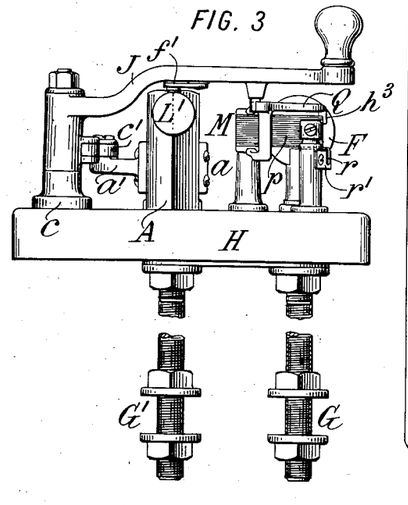
Figure 4:
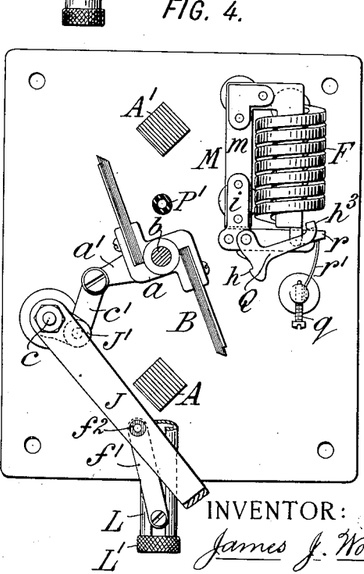
Figures 5, 6, 7, 8, 9, 10, 11, 12:
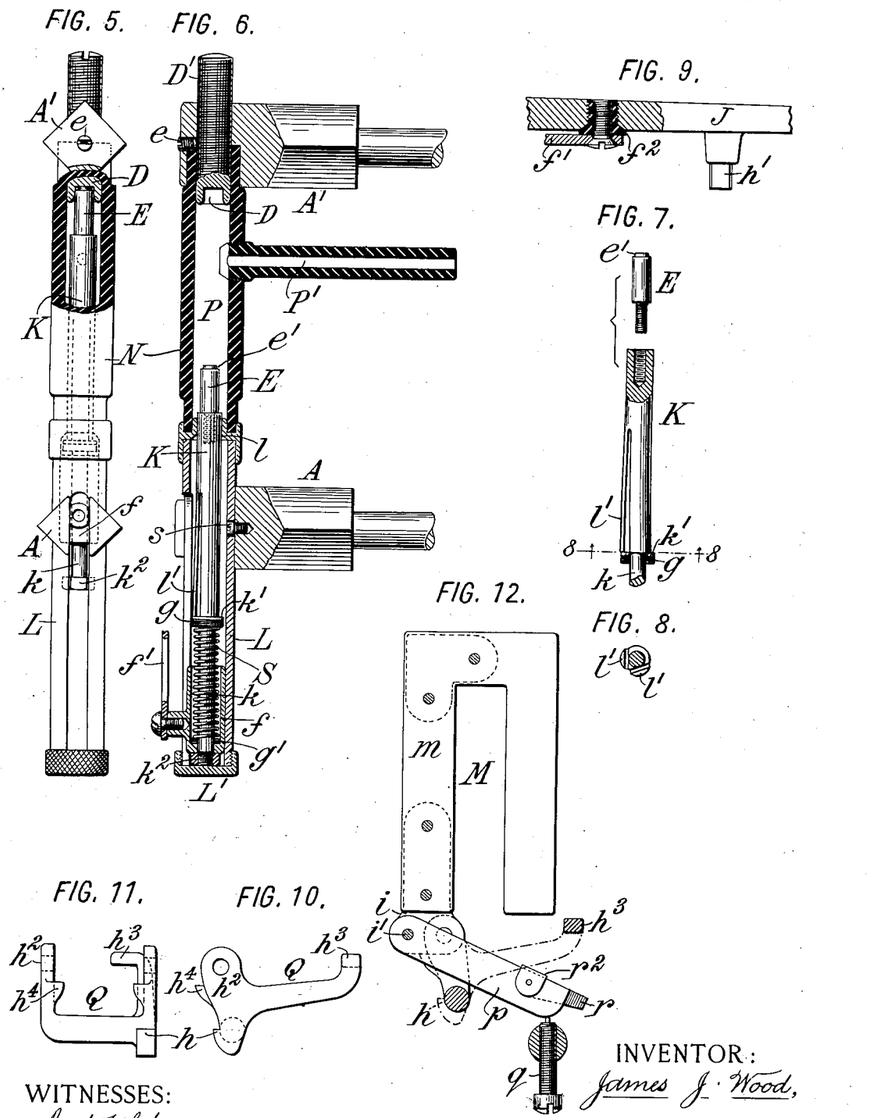
Figure 20:
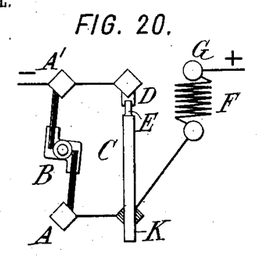

The general features common to the several embodiments of my invention being now understood, I will proceed to describe these several embodiments specifically. For this purpose I will take first the single-break form of circuit-breaker, as shown in Figs. 1 to 12. Referring to these figures, it will be seen that the main terminals A A' are in the form of angular posts fastened rigidly to an insulating base-plate H. The bridge B is in the form of a pair of laminated copper brushes carried on an oscillatory block $a$, which is mounted to turn on a pin or stud $b$. The actuating part is a lever J, having at its end a suitable handle or knob and turning on a stud $c$, fixed to the base-plate and having a short arm J', which is connected by a link $c'$ to an arm $a'$, projecting from the block $a$, whereby the downward movement of the lever from its normal position (shown in Fig. 1) to the position shown in Fig. 4 oscillates the block $a$, and thereby carries the brushes constituting the bridge B out of contact with the respective terminal-posts A A'. Normally these brushes press against the posts, so that the current flows from the post to one brush, then through the conducting-block $a$, and thence through the other brush to the other post, as shown in Fig. 20. The post A' is prolonged back of the base-plate H to constitute the terminal binding-post G', while the other binding-post G is prolonged beyond the front of the plate to form a stud $d$, to which is soldered one end of the heavy copper coil F of the overload-magnet, the opposite end of which is joined to a similar stud $d'$, which is electrically connected at the back of the base-plate by a strip $d^2$ (shown in dotted lines in Fig. 1) to the terminal-post A. Thus the main current entering at G traverses the coil F and the strip $d^2$ to the terminal A and thence flows through the bridge B to the terminal A' and out by the binding-post G'. The shunt-circuit between the terminal-posts A and A' is constituted by the terminals D and E, the connections of which are best seen in Figs. 5 and 6. As shown in these figures, the terminal D is formed on a screw-threaded plug D', screwing directly through the post A' and adjustable therein, being held in any position by a set-screw $e$. The terminal E is here shown as constituting the upper end portion of a vertically-movable rod or plunger K, which is mounted to slide in a tubular metallic casing L, which intersects and is conductively united to the terminal-post A and which so closely embraces the plunger as to make good electrical connection therewith. To insure a good connection, the upper part of the casing L is formed with a neck $l$, Fig. 6, closely embracing the plunger, and the latter is slitted in a manner best seen in Fig. 7, preferably with two slits, as shown in the under side view, Fig. 8, so as to form two outwardly-springing tongues $l'$ $l'$, which bear against the neck $l$ when the plunger is up in its normal position. Below the slitted portion the plunger is reduced to form a shank $k$, which passes freely through a slide $f$, which is mounted to move freely in the casing L, and which on its front side has a lug projecting out through the vertical slot in the front of this casing and connected by a link $f'$ to the actuating-lever J. In order to insulate the actuating-lever J from the shunt-circuit, an insulating-plug $f^2$ is inserted in this lever, as shown in Fig. 9, and the link $f'$ is pivoted by means of a screw entering this plug. The slide $f$ is preferably cup-shaped, as shown, so as to partially inclose the lower portion of the shank $k$, and on this shank and within the cupped portion of the slide is mounted a spring S. This spring is confined between the bottom of the cup and the shoulder on the plunger K, where it is reduced to form the shank $k$. Preferably this shoulder is enlarged by forcing a washer $k'$ tightly on the shank, as shown in Fig. 7, and in order that the spring S may be insulated from the circuit and carry no current its opposite ends are caused to press against insulating washers or pads $g$ $g'$. Fixed on the lower end of the shank $k$ is a head $k^2$, firmly united to it. The lower end of the shell L is closed by a screw-cap L', which serves as a stop for the plunger when thrown down, as shown in Fig. 6. When the lever J is up in its normal position, as shown in Fig. 1, the spring S is compressed, since the slide $f$ has risen farther than the plunger K is capable of moving. Thus the tension of the spring is utilized to press the shunt-terminal E firmly against the terminal D. The insulating-tube N, by which is formed the confined passage P, is held in place by its upper end being socketed in the terminal-post A' and its lower end being engaged by the upper part of the casing L. A branch passage P' is formed of an insulating-tube which is screwed into an opening in the back of the tube N, so that this branch tube projects rearwardly, passing out through a hole in the base-plate H in order to blow the stream of gases safely into the space behind the switchboard. The actuating-lever J when elevated to set the circuit-breaker and close the circuit is caught by a suitable catch or latch, whereby it is held up until this catch is withdrawn, either by hand or by the action of the overload-magnet, to operate the circuit-breaker. The lever J carries an angular pin $h'$, which is engaged by a hook $h$, formed on a gravity-catch Q. (Shown detached in Figs. 10 and 11.) This catch has pivotal ears $h^2$, which respectively pass in front and rear of the core of the magnet M, being freely pivoted on studs entering these ears and projecting from plates $i$ $i$, between which plates the core is embraced. The catch Q has an arm which extends in front of the armature of the magnet and terminates in a toe $h^3$, projecting backwardly and above the free end of the armature in position to be struck by the armature when the latter is attracted to the magnet, whereby the movement of the armature tilts the catch Q and withdraws the hook $h$ sufficiently to free the lever. The same movement of the catch may be performed by hand. The catch is formed with projections $h^4$, which project beneath the plates $i$ and serve to limit the downward movement of the catch, thereby holding it in proper position to engage the pin $h'$ when the lever is moved up. The overload-magnet M is of special construction, being adapted to be readily and with certainty adjusted to respond to alternating or direct currents of varying strength, whereby the maximum current at which the circuit-breaker shall automatically act may be determined within certain limits sufficiently wide for all practical requirements. The preferred form of this magnet is shown in Fig. 12, the exciting-coil F being here omitted. The magnet-core $m$ is preferably of horseshoe form, the armature $p$ being arranged beneath it and pivoted at one end close to one leg or pole of the horseshoe-core, while its other or free end is normally retracted by gravity, although obviously by arranging the magnet in a different position some other retractile force may be substituted. The armature is shown as pivoted between two plates $i$ $i$, already referred to, on a pin $i'$, passing through it, this being a convenient construction. Thus the pivotal end of the armature is brought into close juxtaposition to one leg of the core in such manner that when retracted there is a slight angular gap between, the angle of which gap diminishes as the armature is retracted, thereby diminishing the magnetic resistance. The free end of the armature is retracted a greater or less distance from the magnet, according to the adjustment of a stop $q$, which is most conveniently constructed as an adjusting-screw. The lower the armature falls the wider the magnetic gap and the greater the magnetic resistance and reluctance, and consequently the higher must be the excitation of the magnet which will suffice to attract the armature. By adjusting the armature higher or lower the number of amperes required to attract the armature may be regulated to a nicety. To indicate this amount and serve as a guide in the adjustment, I provide a scale $r'$, traversed by a pointer $r$. The scale is preferably fixed, and the pointer is preferably carried by the armature, as shown; but they may be otherwise arranged. Thus in Fig. 2 the scale is graded for fifty, seventy-five, or one hundred amperes, and by setting the screw up or down until the pointer comes to one or another of these graduations the magnet is adjusted to attract its armature when the current rises to the number of amperes indicated. The arrangement of the armature relatively to the core is such that the current which energizes the magnet sufficiently to start the attraction of the armature will certainly continue its movement and will move it with continually-increasing energy by reason of the shortening of the magnetic gap and the consequent diminution of the magnetic resistance and reluctance. It results that the armature, which remains safely retracted and undisturbed under a normal current, is attracted when the prescribed overload is reached and upon commencing to move acquires instantly an accelerated velocity, and the farther it moves the more powerful becomes the force which moves it, so that it strikes the magnet-core a sharp and powerful hammer-blow. The toe $h^3$ of the catch Q is so arranged that it is struck by the armature at near the end of the latter's movement and when consequently the armature has acquired a considerable velocity, so that its momentum, as well as the increased magnetic attraction, is utilized to insure that the catch shall be withdrawn with great certainty. In order that the circuit-breaker may be used with alternating currents, I construct the magnetic circuit of laminated iron. Thus both the magnet-core $m$ and armature $p$ are shown as built up of laminæ. To prevent magnetic adhesion of the armature to the core, I face the free end of the former with a strip $r^2$ of non-magnetic metal. This strip preferably has ears, which are bent down on the front and rear faces of the armature, and on the rear face is conveniently prolonged and bent outward to form the pointer $r$.

Figure 21:
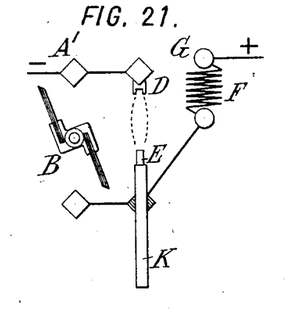
Figure 22:
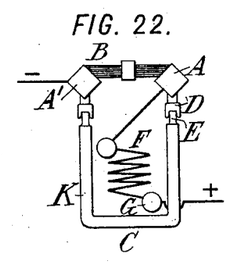
Figure 23:
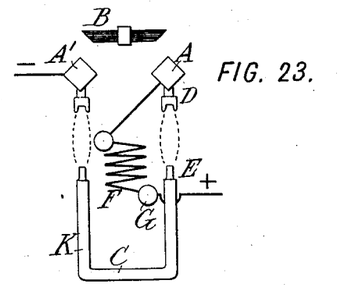

I will now describe the operation in detail. The circuit being open, as shown in Fig. 21 and in Fig. 4, (except that the armature and catch will have fallen to the position shown in Fig. 1,) it is closed manually by the operator grasping the handle on the lever J and raising this lever. The first effect of this is to simultaneously raise the plunger K, supported on the spring S, and to oscillate the block $a$, carrying the conducting-brushes or bridge B, to swing these brushes toward the terminals A A'. Before these brushes reach the terminals, however, the shunt-terminal E strikes against the shunt-terminal D and is thereby arrested, so that continuation of the movement compresses the spring S. This continues until the brushes B strike the terminals A A', whereupon the movement of the lever J continues enough farther to press these brushes into firm contact therewith, at which instant the pin $h'$ on the lever is caught by the catch Q, the hook of which drops under this pin and holds the lever, as shown in Fig. 1. The circuit is thus closed first through the shunt-contacts D E and immediately thereafter through the main bridge B, and it will continue closed until the catch Q is withdrawn to drop the lever J. This catch may be withdrawn manually by rocking it by hand or by pressing up the armature against it by hand, or it may be withdrawn electromagnetically upon the occurrence of an overload. In either case the lever J when released is thrown down at first under the combined influence of gravity and the tension of the spring S and subsequently by gravity alone. During the first part of this movement the slide $f$ is descending and the spring S is expanding, while at the same time the brush-carrying block $a$ is oscillated to swing the brushes B away from the terminals A A', so that these brushes break contact with these terminals while the circuit is still maintained through the shunt, since the shunt-terminals D E still remain in contact. This continues until in the downward movement of the slide $f$ its lower end strikes the shoulder formed by the head $k^2$ at the lower end of the plunger K, whereby this plunger is caused to move downward, thereby carrying the shunt-contact E away from the stationary shunt-contact D. From the instant of this impact the remaining movement is due to the momentum of the rapidly-moving lever and connected parts, assisted by the weight of the descending parts. Thus the movement of the lever rapidly accelerates under the action of gravity and the stress of the spring S until the instant of impact, so that a heavy blow is struck against the head $k^2$ and the plunger K is driven down with a quick and positive motion, such that the shunt-contacts are separated with great velocity, and hence with the least possible drawing of an arc between them. Such arc as is formed, however, is confined within the passage P, Fig. 6, in which with great suddenness is accumulated a sufficient pressure of vapors or gases to cause an energetic outblast through the outlet-passage P', the puff of which instantly blows out the arc. The operation is so sudden that on any circuit to which the instrument is proportioned it operates perfectly to break the circuit without any deterioration of the main bridge or brushes B, which are normally relied upon to carry the current, and with so slight a formation of an arc, and that so quickly extinguished, that the burning or pitting of the shunt-terminals is extremely slight, and these terminals may be used many times without needing renewal. Some burning or pitting of the shunt-terminals between which the final break of the circuit occurs is of course inevitable, and under exceptional conditions, such as an extreme overload due to an accidental short circuit many times repeated, they are liable to be so seriously burned, pitted, or fused as to be incapable thereafter of making a perfect contact. Hence it is important both to so shape these terminals as to minimize the effect of any burning or pitting and to so construct the circuit-breaker as to admit of readily replacing either or both the shunt-terminals when this becomes necessary. I prefer to form one of the shunt-terminals as a cup or socket and the other as a plug adapted to fit into this socket. I have shown the shunt-terminal D formed as a cup or socket and the terminal E as a plug, the sides of which closely fit this socket and the end of which abuts squarely against the bottom end of the socket. In the separating movement the final breaking of contact occurs around the periphery of the plug, where it separates from the rim of the cup, and it is these portions which are most subject to burning or vaporization, and consequently to the forming of pits or blisters. To diminish as far as possible this effect, I slightly bevel the open end of the cup and I chamfer away the corner of the plug, as shown at $e'$, Figs. 6 and 7. Any pitting or blistering on these reduced surfaces is hence not liable to prevent the plug entering the cup, as shown in Fig. 5, so closely as to make a perfect contact. The plug or contact E by reason of its smaller mass is more liable to be injured, and I prefer to construct this as a removable tip upon the plunger K, as shown in Fig. 7, being united to it by a screw-thread connection, as shown, or otherwise. It may be rendered accessible in order that it may be removed and replaced by a new one by unscrewing the head L' and drawing the plunger out through the bottom of the casing L. The cupped terminal D, which will less often require renewal, requires only to be unscrewed upwardly after loosening the set-screw $e$. After repeated use the insulating-tube N is liable to become so burned by the arcs within it as to require renewal. To facilitate this, the casing L is made movable, so that by taking out the plunger K and removing a screw $s$ it may be slid downwardly in the post A sufficiently to liberate the lower end of the tube N, so that this tube (the branch P' having been first unscrewed from it) may be drawn downwardly to extricate its upper end from the post A', and thereby taken out and replaced, whereupon the casing L is pushed up to place and the screw $s$ inserted.

The circuit-breaker thus far described is well adapted for currents the energy of which is not too great to admit of their being effectively broken by the separation of a single pair of final circuit-breaking terminals; but for circuits carrying currents of a higher energy, such as render a plurality of circuit-breaking points desirable, I prefer other embodiments of my invention giving in the shunt-circuit two, three, or more breaks. Of these forms I shall describe in detail only the double-break circuit-breaker. (Shown in Figs. 13 to 18, inclusive, and in the diagrams Figs. 22 and 23.) In these figures I will use the same letters of reference in so far as they apply to corresponding parts. The principal differences between this double-break circuit-breaker and the single-break circuit-breaker already described will be apparent upon comparing Figs. 22 and 23 with Figs. 20 and 21. The terminals A A' instead of being arranged one above the other are here arranged side by side, and instead of the main conducting-bridge B being arranged to oscillate it is arranged above the terminal-posts to extend horizontally from one to the other, and it breaks connection with them by moving bodily upward. Instead of the shunt-circuit C comprising only one pair of circuit-breaking terminals D E it comprises two pairs, of which the terminals D D are mounted on the main terminals A A', while the movable terminals E E are mounted on a pair of plungers K, connected together in U shape by a cross-bar K'. Thus the necessity of any sliding contact between the plunger and its casing, as in a single-break circuit-breaker, is avoided. The overload-magnet is in this construction arranged for convenience between the legs of the plunger K.

Figure 13:
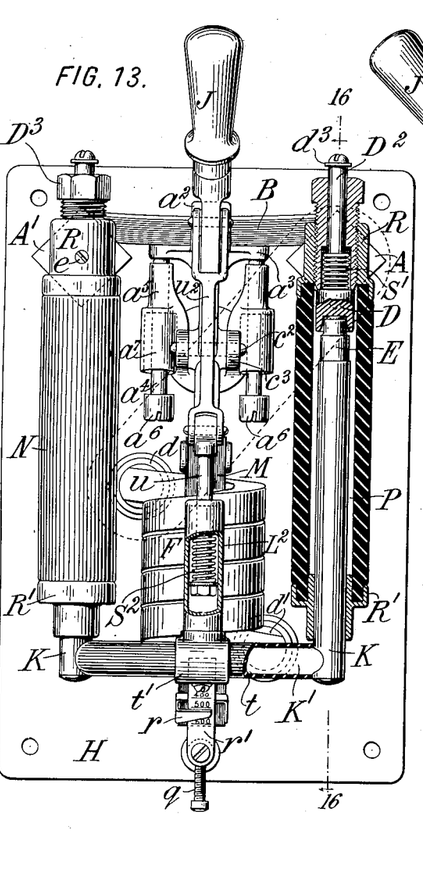
Fig. 13 is a front elevation, partly in vertical section.
Figure 14:
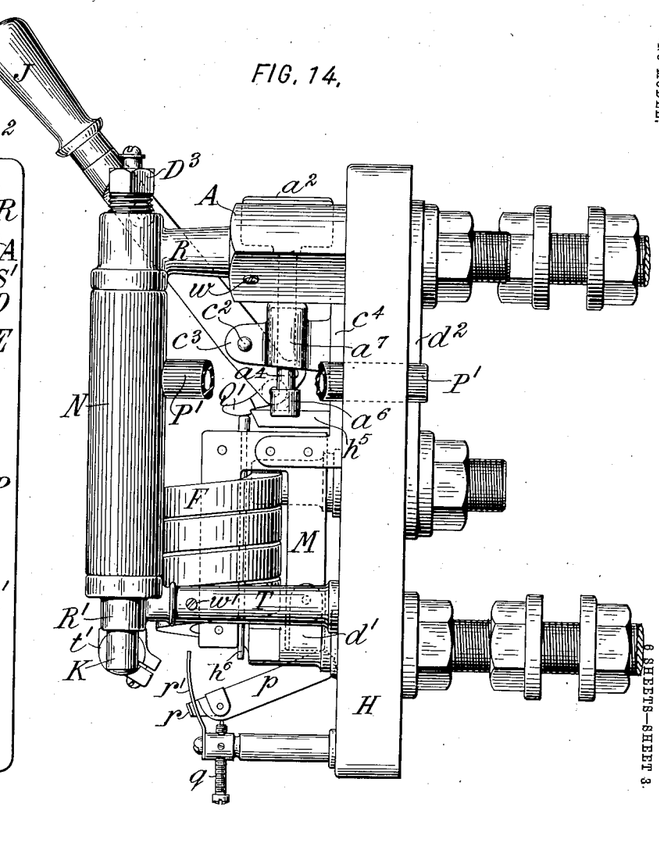
Fig. 14 is a side elevation.
Figure 15:
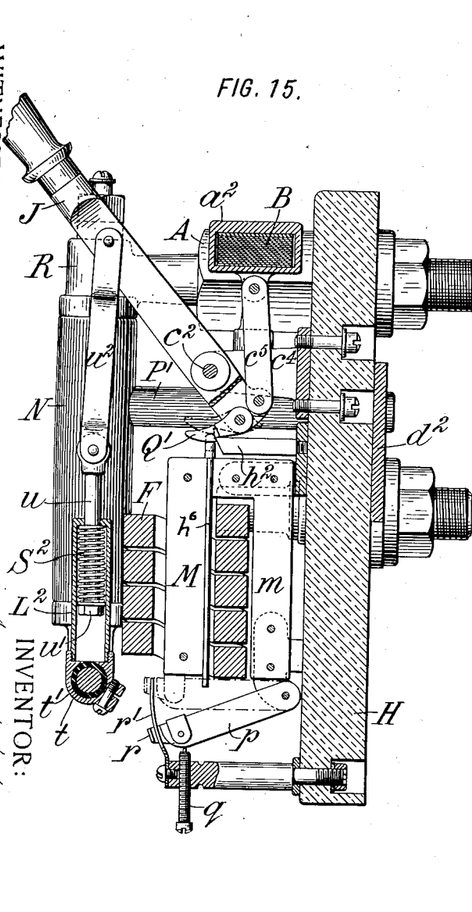
Fig. 15 is a side view in vertical mid-section.
Figure 16:
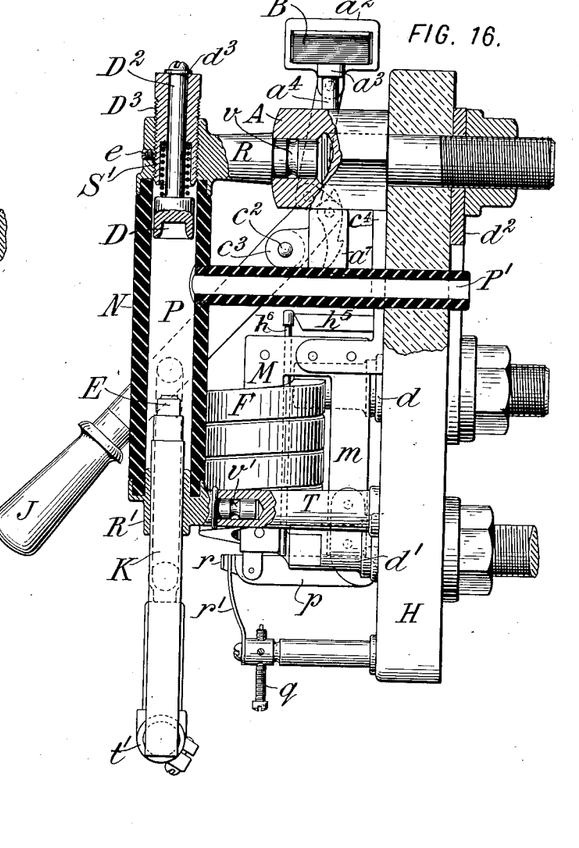
Fig. 16 is a side view in section on the line 16 16 in Fig. 13.
Figure 17:
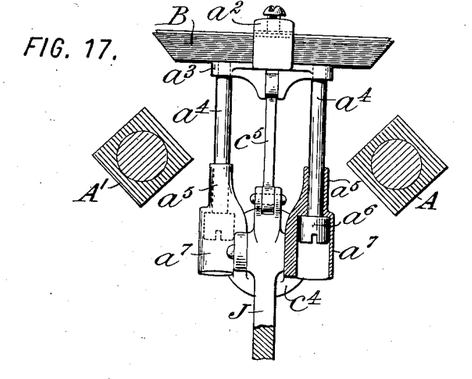
Fig. 17 is a fragmentary front elevation, certain parts being removed, the circuit-breaker being shown before operation in Figs. 13, 14, and 15 and after operation in Figs. 16 and 17.
Figure 18:
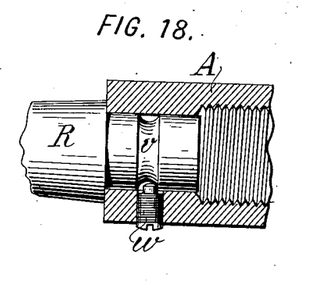
Fig. 18 is an oblique section through the terminal post A, showing a detail. A triple-break circuit-breaker is shown in front elevation in Fig. 19 on a reduced scale.

Referring to Figs. 13 to 16, the terminal posts A A' are fixed to the insulating base-plate H in substantially the same manner as before, while to each post is removably secured a metal head R, within which screws a vertical tubular adjusting-screw $D^3$, through the bore of which works the stem of a plunger $D^2$, which on its lower end carries the cup-shaped shunt-terminal D, which receives the downward pressure of a spring S', contained in a counterbored socket in the screw $D^3$. The plunger $D^2$ has on its upper end a collar or head $d^3$, which limits its downward movement in the screw $D^3$, as shown in Fig. 16. Its upward movement in the screw is limited by its enlarged portion striking the lower end of the screw, as shown in Fig. 13, whereby its head $d^3$ is lifted perceptibly above the top of the screw. The terminal D is adjustable by screwing the screw $D^3$ up or down, the latter being set in any position by the set-screw e. The insulating-tube N, forming the passage P, is confined at its upper end in a socket in the head R and at its lower end in a socket in a head R'. The plunger K, carrying the terminal E, slides freely through this lower head. The two plungers K K are connected by a transverse bar or head K', rigidly secured to them at its ends, so as to form a U-shaped structure. The bar K' is preferably covered with an insulating-sheathing t, which at its middle is embraced by a clamp t', Fig. 15, to which is attached a tubular shell or cylinder $L^2$, inclosing a spring $S^2$, (corresponding to the spring S in the former construction,) which spring is compressed between an inturned flange on the shell $L^2$ and the head u' on a rod u, which rod passes out through the top of this shell and is connected by a link $u^2$ to the actuating-lever J. This lever instead of swinging in a plane parallel with the base-plate H, now swings in a plane perpendicular thereto, being pivoted on a pin $c^2$, held in ears $c^3$, projecting from a pedestal or casting $c^4$. The main conducting-bridge B is composed of a laminated copper brush, which extends in substantially straight horizontal direction between the terminal-posts A A'. It is held at its middle portion by a socket or clamp $a^2$, from the lower plate $a^3$ of which vertical guide-rods $a^4$ pass downwardly, being guided in stationary guides $a^5$, which for convenience are best mounted on the casting or pedestal $c^4$. The lower ends of the rods $a^4$ carry heads $a^6$, which serve as stops to limit the upward movement of the brush and by entering cylinders $a^7$, as best seen in Fig. 17, serve as retarders or dash-pots to moderate the movement. The brush B is moved up or down by the actuating-lever J, which is connected to the clamp $a^2$ by means of a link or connecting-rod $c^5$, Figs. 15 and 17. The overload-magnet M is of substantially the same construction as that first described. It is conveniently arranged in the middle between the tubes N N and somewhat behind them, as shown, being shown as arranged with its magnet-core in a vertical plane perpendicular to that of the base-plate. Its coil F is mounted on conducting-supports d d', as before, and its armature p is pivoted adjacent to the rear leg of the core n, so that its free end, carrying the pointer r, traversing the scale r', is at the front, and its drop is adjusted, as before, by the screw q. The hooked catch by which the actuating-lever J is upheld is in this construction somewhat changed, the hook Q' being now carried by the lever J, as shown in Fig. 15, its hook normally engaging a fixed stud $h^5$ and being disengaged therefrom by the attracting movement of the armature p through the medium of a rod $h^6$, which passes through the magnet-core m, so as to be guided therein, its upper end or head coming just beneath the hook Q' and its lower end projecting, as shown in Fig. 15, into the path of the armature, so as to be struck thereby in the same manner as the toe $h^3$ in the previous construction. When so struck, the pin is driven up, and its head lifts the hook Q' to the position shown in dotted lines in Fig. 15, thereby disengaging it from the stud $h^5$ and freeing the lever, which is immediately thrown down both by its own weight and the stress of the spring $S^2$, aided by the tension of the springs S'. The lever in thus falling first through the link $c^5$ elevates the conducting-bridge B, so as to bring its ends out of contact with the terminal posts A A' and while the shunt-contacts D E remain closed together. Immediately thereafter the head u' on the rod u strikes the bottom of the shell $L^2$, and thereby abruptly and by a severe blow drives down the connected plungers K K, simultaneously carrying the terminals E E out of contact with the terminals D D and effecting the final break of the circuit, the arcs formed between these terminals blowing themselves out through the passages P P', as before described. As the lever falls the ascending heads $a^6$ enter the cylinders $a^7$ and proceed to compress the air therein, whereby the end of the fall of the lever is cushioned, and the lever is stopped gently as the air finally escapes from the cylinders and the heads come to rest against the ends thereof, as shown in Fig. 17. Immediately upon breaking the circuit the armature p falls to its normal position. To close the circuit, the operator throws up the lever J, which is caught by its catch Q' falling again into engagement with the stud $h^5$. In closing the circuit the operator should note whether the heads $d^3$ are lifted normally above the tops of the screws $D^3$, as shown in Fig. 13. If not so lifted, or if one is lifted higher than the other, it will indicate that the terminals D or E on one or both sides have been injured or require adjustment. If either terminal E has been so pitted as not to enter fully into its socket D, the head $d^3$ of this socket will be raised prematurely and the other head will not be raised to the normal amount. The same result ensues if either terminal has been shortened by burning off a portion of its tip. In either case the adjustment can be corrected by screwing the respective screws $D^3$ up or down. If either head $d^3$ fails to lift when the lever J is thrown up, it indicates that the terminals D or E on that side have been so far fused away as to fail to make contact. It becomes then necessary to renew either or both these terminals. To renew the terminals E, it is only necessary to disconnect the link $u^3$ at either end, whereupon the U-shaped conductors K K K' can be drawn out beneath through the heads R'. Thus the condition of the terminals E E can be ascertained by inspection, and either one can be unscrewed and a new one substituted for it. To inspect the terminals D D, it is only necessary to screw out at the top their screw-threaded holders $D^3$. To renew the insulating-tubes N N, it is only necessary to disconnect the heads R R', to facilitate which these heads are removably attached, the one to the main terminal A or A' and the other to a supporting post or pedestal T, which have sockets entered by necks on the respective heads, these necks being formed with grooves or depressions $v$ $v'$, Fig. 16, which are entered by set-screws $w$ and $w'$, respectively, Fig. 14, so that it is only necessary to withdraw these screws in order to release the heads R R', which can then be removed toward the front and separated to release the tube N. To hold the heads R R' tightly in place, the screws $w$ $w'$ bear against one side of the grooves $v$ or $v'$ in such manner as to act upon the inclined portion thereof and, as the screws are set in, to draw or wedge the neck backward, so as to draw the head tightly against its shoulder, as is shown with reference to the head R in the oblique section, Fig. 18.

Figure 19:
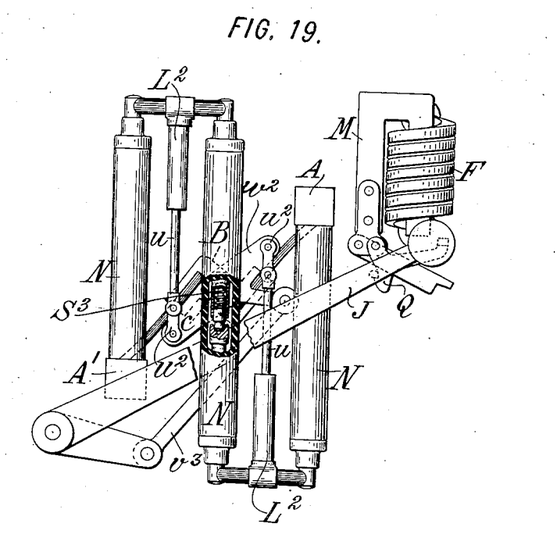
Figure 24:
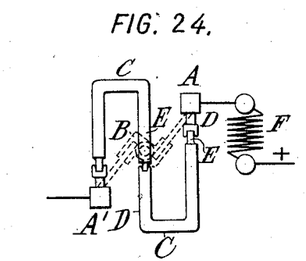
Figure 25:
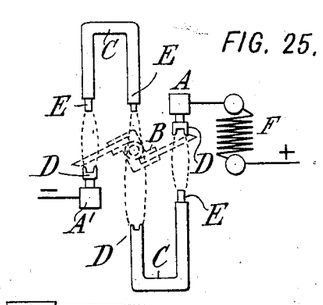

A triple-break circuit-breaker embodying my invention is shown in Fig. 19 and diagrammatically in Figs. 24 and 25. In these diagrams the conducting-bridge B, which is made to oscillate, as in the single-break circuit-breaker, is shown in dotted lines. The shunt-circuit C is made up of two U-shaped members instead of the one shown in Figs. 22 and 23, which members are mounted to have a simultaneous movement away from each other and from the fixed terminals A A' to the effect shown in Fig. 25. The result of this movement is that the right and left hand shunt-terminals D E are separated a normal amount, while the intermediate terminals D E are separated to twice this extent, thus making simultaneously three breaks in the shunt-circuit and drawing three arcs, which blow themselves out, as before described, each pair of terminals being inclosed in the same manner as heretofore described for the single-break and double-break instruments. One of the intermediate terminals D E is mounted on a spring $S^3$. A suitable way of imparting the requisite movements is shown in Fig. 19, where the magnet M, constructed as in Fig. 1, controls the catch or detent whereby the actuating-lever J is restrained, this lever being connected by a link $v^3$ to a lever $w^2$, which may turn on a fulcrum pin or axis concentric with that on which the oscillating brush turns, as shown, in which case the lever $w^2$ and oscillating block $a$ for this brush may be made integral or otherwise connected to move together. The U-shaped members are constructed as shown in Figs. 13 to 16 and provided each with a cylindrical shell $L^2$, as there shown, inclosing a spring, the plunger-stem $u$ of which is connected by a link $u^2$ to an arm of the lever $w^2$, the connections of the two links being upon opposite sides of the fulcrum of the lever, as shown, so that as the operating-lever falls the one member is thrown down and the other is thrown up.

Figure 26:
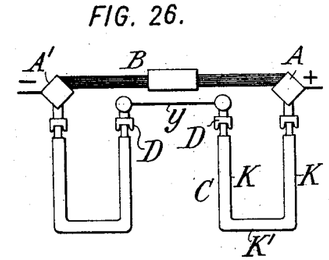
Figure 27:
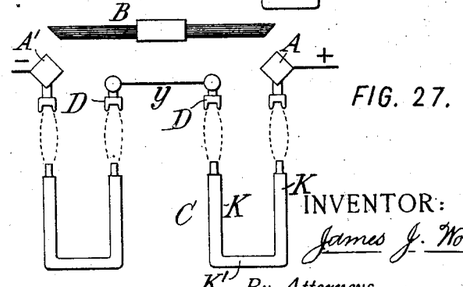

Figs. 26 and 27 show diagrammatically a suitable arrangement for a four-break circuit-breaker. The main terminals A A' are here connected by a single brush B, as in Figs. 22 and 23, which is lifted to break the main circuit, while the shunt-circuit C consists of two U-shaped members each comprising sliding plungers K K, connected by an intervening bar K' exactly as in the two-break construction, the shunt-circuit being completed by a conductor $y$, joining the two inner shunt-terminals D D, as shown. The magnet-coil F is not here shown, but may be located where convenient, and the U-shaped movable members or connected plungers may be mechanically operated by a duplication of the means described with reference to Figs. 13 to 16 or may be in any suitable way connected mechanically for simultaneous operation in the described manner.

It is not to be understood from the specific and detailed descriptions which I have given of certain embodiments of my invention that I am to be confined to the details or mechanical means therein employed for carrying my invention into effect. My invention is susceptible of a wide range of modification in respect of its mechanical features and may be greatly varied in construction without departing from those features which are essential and which are formulated in the claims hereunto appended.

I claim as my invention—

1. A circuit-breaker comprising in combination a main and a shunt circuit, means accelerated by gravity and connected with a terminal of said shunt-circuit for first moving a terminal of said main circuit to break said main circuit, and then suddenly moving a terminal of said shunt-circuit to break said shunt-circuit, and a spring arranged to assist the initial movement of said means.

2. A circuit-breaker comprising in combination a main and a shunt circuit, a magnetically-released operating member arranged when released to fall by gravity with accelerating speed, means operated by the initial slow movement of said operating member for breaking the main circuit, means operated by a hammer-blow from said operating member after the acceleration of its movement to move a terminal of said shunt-circuit to break the same and widely separate the shunt-terminals, and a spring between said operating member and shunt-terminal to assist the initial movement of said operating member and to take up the lost motion thereof.

3. A circuit-breaker comprising in combination a main and a shunt circuit, a bridge carrying the shunt-circuit and adapted to be separated out of said circuit so as to break the same at a plurality of points, and means accelerated by gravity for first moving a terminal of said main circuit to break the same, and then suddenly moving said bridge to break the shunt-circuit.

4. A circuit-breaker having separable circuit-breaking terminals formed the one as a cup-shaped socket and the other as a plug entering said socket and having a flat end with a circumferential groove or chamfer at its edge; whereby the pitting thereof is diminished, and means for pressing said terminals together with a spring-pressure and with the end of said plug against the base of said socket.

5. A circuit-breaker having separable circuit-breaking terminals, a tube of insulating material inclosing said terminals to utilize the vapors generated during their separation to blow out an arc between them, and supports engaging the opposite ends of said tube.

6. A circuit-breaker having separable circuit-breaking terminals, a tube of insulating material inclosing said terminals to utilize the vapors generated during their separation to blow out an arc between them, and supports engaging the opposite ends of said tube, said supports adapted to be separated to permit the removal of said tube.

7. A circuit-breaker having main-circuit terminals with a conducting-bridge connecting them and movable to break contact with both such terminals and with two pairs of circuit-breaking terminals in a shunt around said bridge, and means accelerated by gravity for first so moving said bridge while said shunt-terminals are stationary, and for subsequently giving said shunt-terminals a sudden movement for separating them, whereby both the main and shunt circuits are broken in two places.

8. A circuit-breaker comprising in combination a main bridge for carrying the current normally between opposite main terminals, a shunt around said bridge, two pairs of terminals in said shunt, so inclosed as to utilize the vapors generated during their separation to blow out an arc between them, and means accelerated by gravity adapted to first move said bridge to break the main circuit and to subsequently suddenly separate one of each pair of said shunt-terminals from the other to break said shunt.

9. A circuit-breaker having main and shunt terminals, a bridge connecting the main terminals, an operating part, a spring connecting said operating part to one of said shunt-terminals and adapted to move said operating part to open the circuit, a catch normally restraining said spring, whereby when said catch is withdrawn the operating part is moved with an accelerating speed, said operating part being adapted to move said bridge during the slower first part of its movement, and to move said shunt-terminal at a later part of its movement, when it has acquired greater acceleration, whereby it separates the shunt-terminals with a quick sudden movement, and a dash-pot for gradually checking the speed of said part toward the end of its movement.

10. A circuit-breaker comprising means for breaking the main circuit, two pairs of circuit-breaking terminals in a shunt-circuit, said shunt including a longitudinally-movable U-shaped member the ends of its legs forming respectively one terminal of each of said pairs, and movable to carry said terminals away from their mates to break the shunt, a separate tube of insulating material inclosing each of said pairs of terminals to utilize the vapors generated during their separation to blow out an arc between them, and an operating part connected to so move said member.

11. A circuit-breaker comprising means for breaking the main circuit, a pair of circuit-breaking terminals in a shunt-circuit, a longitudinally-movable plunger the end of which forms one such terminal, a spring normally pressing said plunger toward the other terminal, and an operating-lever, said lever and plunger being provided with reciprocal shoulders adapted after a given movement of said lever to abut and cause the plunger to be moved with said lever.

12. A circuit-breaker comprising in combination a pair of terminals, an operating means for separating them, a spring arranged to move one of said terminals in a direction to give said operating means an initial movement, and means connected to the other of said terminals and operated by a hammer-blow from said operating means whereby the continued movement of said operating means acts to suddenly separate said terminals.

13. A circuit-breaker comprising in combination a pair of terminals, an operating means connected to one of said terminals for separating them, two springs connected one to each of said terminals and both arranged to move said terminals in a direction to give said operating means an initial movement, and means whereby the continued movement of said operating means acts to suddenly separate said terminals.

14. A circuit-breaker comprising means for breaking the main circuit, two pairs of circuit-breaking terminals in a shunt-circuit, said shunt including a U-shaped member, the ends of its legs forming respectively one terminal of each of said pairs, an insulating-sheathing $t$ covering the middle portion of said member, a clamp $t'$ embracing said sheathing at its middle portion, and an operating-lever connected to said clamp.

15. A circuit-breaker having separable circuit-breaking terminals so inclosed as to utilize the vapors generated during their separation to blow out an arc between them, an adjustable stop, and a spring engaging one of said terminals and reacting against said stop, the other terminal being movable toward and from said terminal.

16. A circuit-breaker having separable circuit-breaking terminals so inclosed as to utilize the vapors generated during their separation to blow out an arc between them, one of said terminals being provided with adjusting means and the other movable toward and from said terminal, a spring, and means acting through said spring for pressing said latter terminal toward the former to close the circuit.

17. A circuit-breaker having separable circuit-breaking terminals inclosed in a passage opening exteriorly, an adjusting-screw carrying one of said terminals with an end projecting out of said passage, whereby said terminal is adjustable toward the other terminal, and the other terminal movable toward and from said terminal, and an operating-lever for so moving it.

18. A circuit-breaker having separable circuit-breaking terminals inclosed in a passage opening exteriorly, one of said terminals provided with a movable stem, an adjusting-screw carrying said terminal, and a spring reacting against said screw for cushioning said terminal whereby when the other terminal is pressed against it, it is displaced, and its displacement is limited by the adjustment of said screw.

19. A circuit-breaker having separable circuit-breaking terminals inclosed in a passage opening exteriorly, one of said terminals provided with a movable stem, an adjusting-screw carrying said terminal with its stem passing through said screw, and a spring reacting against said screw for cushioning said terminal whereby when the other terminal is pressed against it it is displaced, and its displacement is indicated by the movement of the portion of said stem projecting through said screw.

20. A circuit-breaker having two pairs of separable circuit-breaking terminals inclosed in a passage, one terminal of each of said pairs having a stem projecting out of said passage when the circuit is closed, whereby the relative positions of the two pairs of terminals within the passage may be noted and means for relatively adjusting the two terminals of each pair whereby simultaneous separation may be insured.

21. A circuit-breaker having separable circuit-breaking terminals inclosed in a passage opening exteriorly, one terminal D having a neck $D^2$ and head $d^3$, an adjusting-screw $D^3$ carrying said terminal and through which said neck passes, and a spring $S'$ interposed between said terminal and screw.

22. A circuit-breaker having two pairs of circuit-breaking terminals inclosed respectively in passages opening exteriorly, the terminal D of each pair being yieldingly seated, adjusting-screws for limiting the movement of said terminals respectively, and the reciprocal terminals E E formed on plungers K K movable through the respective passages, said plungers connected together for simultaneous movement.

23. A circuit-breaker having a base-plate, an insulating-tube mounted in front of said plate, circuit-breaking terminals inclosed in said tube, operating means for quickly separating said terminals, an outlet-tube extending from said insulating-tube through said base-plate, whereby the vapors generated during the separation of said terminals blow through said outlet-tube into the space behind said base-plate, and sockets on said base-plate for receiving the heads of said insulating-tube, said sockets being substantially parallel with said outlet-tube whereby to facilitate removal of said insulating-tube.

24. In a circuit-breaker, an insulating-tube N, opposite heads R R' holding said tube and having necks extending in a direction perpendicular to said tube, and supports to which said necks are detachably connected to permit of the removal of said tube.

25. In a circuit-breaker, an insulating-tube N, opposite heads R R' holding said tube and having reduced necks extending in a direction perpendicular to said tube, supports for said heads having sockets receiving said necks, and fastening-screws entering said sockets and adapted to set the necks fast therein.

26. In a circuit-breaker, a conducting-bridge and means for guiding the same comprising a guide-rod moving in a guide, the free end of said rod carrying a head serving as a stop to limit the movement of said rod, and the corresponding end of said guide being enlarged to form a cylinder loosely fitting said head so as to form a dash-pot therewith.

27. In a circuit-breaker, a conducting-bridge B, guide-rods $a^4$ attached thereto, stationary guides $a^5$ in which said guide-rods move, said rods carrying heads $a^6$ serving as stops to limit the movement of said bridge, and said guides being formed with cylinders $a^7$ loosely fitting said heads so as to form dash-pots therewith.

28. A circuit-breaker comprising in combination a pair of plungers carrying terminals of the circuit, a cross-bar connecting said plungers, an operating member, and a spring connection between said operating member and said cross-bar adapted to be strained by a movement of said operating member in a direction to close said circuit.

29. A circuit-breaker comprising in combination a pair of plungers carrying terminals of the circuit, a cross-bar connecting said plungers, an operating member, a tubular shell or cylinder attached to said cross-bar and inclosing a spring, and a headed rod attached to said operating member and reciprocating in said shell and adapted to compress said spring by a movement of said operating member in a direction to close said circuit.

30. A circuit-breaker comprising in combination a pair of plungers carrying terminals of the circuit, a cross-bar connecting said plungers, and an operating-lever connected to said cross-bar and arranged to swing between said plungers and in a plane perpendicular to said plungers and cross-bar.

In witness whereof I have hereunto signed my name in the presence of two subscribing witnesses.

JAMES J. WOOD.

Witnesses:
ARTHUR L. HADLEY,
FRED S. HUNTING.